US012444839B2

(12) United States Patent
Mannan

(10) Patent No.: US 12,444,839 B2
(45) Date of Patent: Oct. 14, 2025

(54) ANTENNA

(71) Applicant: Michael Mannan, Harrow Middlesex (GB)

(72) Inventor: Michael Mannan, Harrow Middlesex (GB)

( * ) Notice: Subject to any disclaimer, the term of this patent is extended or adjusted under 35 U.S.C. 154(b) by 40 days.

(21) Appl. No.: 18/548,308

(22) PCT Filed: Feb. 23, 2022

(86) PCT No.: PCT/GB2022/050500
§ 371 (c)(1),
(2) Date: Aug. 29, 2023

(87) PCT Pub. No.: WO2022/185030
PCT Pub. Date: Sep. 9, 2022

(65) Prior Publication Data

US 2024/0145916 A1 May 2, 2024

(30) Foreign Application Priority Data

Mar. 4, 2021 (GB) ...................................... 2103037

(51) Int. Cl.
*H01Q 3/44* (2006.01)
*H01Q 1/32* (2006.01)
*H01Q 9/04* (2006.01)

(52) U.S. Cl.
CPC ............. *H01Q 3/44* (2013.01); *H01Q 1/3266* (2013.01); *H01Q 1/3283* (2013.01); *H01Q 9/0414* (2013.01)

(58) Field of Classification Search
USPC .......................................................... 343/702
See application file for complete search history.

(56) References Cited

U.S. PATENT DOCUMENTS 6,329,958 B1 * 12/2001 McLean ............... H01Q 17/001 343/769
2019/0165476 A1 * 5/2019 Hong .................. H01Q 21/065

FOREIGN PATENT DOCUMENTS

| | | | |
|---|---|---|---|
| GB | 2505495 | A | 3/2014 |
| GB | 2544558 | A | 5/2017 |
| GB | 2573850 | A | 11/2019 |
| WO | 2014033482 | A1 | 3/2014 |
| WO | 2017089753 | A1 | 6/2017 |
| WO | 2019220078 | A | 11/2019 |

* cited by examiner

*Primary Examiner* — Dimary S Lopez Cruz
*Assistant Examiner* — Brandon Sean Woods
(74) *Attorney, Agent, or Firm* — Craft Chu PLLC; Andrew W. Chu

(57) ABSTRACT

The antenna includes a pair of electrically conducting first lands and a pair electrically conducting second lands disposed in a first plane. The antenna includes an antenna feed mechanism for the pair of first electrically conducting lands; and a third conducting land in a second plane parallel to the first plane. The antenna also includes a fourth conducting land in a third plane substantially parallel to both the first plane and the second plane, offset from both first plane and the second plane with the second plane located between the first and third planes.

20 Claims, 4 Drawing Sheets

ANTENNA

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

This invention relates to antennae. In one form it relates to an antenna which is particularly suited for, but not limited to integration in an automobile. The antenna can be used to boost the signal strength of radio signals used in certain frequency bands. The antenna may, for example, find particular application for receiving/transmitting GSM, LTE, Bluetooth, 4G, 5G or Wi-Fi signals or for receiving terrestrial television signals.

2. Description of Related Art Including Information Disclosed Under 37 CFR 1.97 and 37 CFR 1.98

In recent years, the growth in consumer electronics has been significant. Such consumer electronics includes, but is not limited to televisions, monitors, mobile telephones, smartphones, tablet computers, laptops, personal computers, portable games consoles, smartwatches and smart devices. As these devices become more prevalent in everyday left, there is a need for these devices to be capable of radio reception, but it for connection to the internet, another device, or merely to receive information. This need coupled with the trend to miniaturize these devices, be it for aesthetic and/or portability reasons, means that a wireless connection is the only viable option.

The conventional approach with most of these devices is to miniaturize the relevant receiving/transmitting antennae. The antennae are miniaturised to the extent possible whilst still enabling acceptable performance. However, what would pass as acceptable performance in ideal conditions can rapidly degenerate into unacceptable performance in real world use. For example, intermediate objects, neighbouring devices, signals, and antennae can mean that the strength of the received signal is poor at best, and the low performance of the antenna does little to improve the situation. This can result in dropped packets when the antenna is used for connection to the internet. In low bandwidth applications, this may not be noticed, but with the emergence of high-bandwidth applications (e.g. 720p, 1080p, Ultra HD, 4K, 8K television, game streaming services, etc.), a reliable, stable connection is necessary.

It is also common for these devices to have built-in cellular capability, where they connect directly to a base station of a cellular network. It is known that such devices can permit “tethering” to provide cellular-based WAN access (i.e. the internet) to a tethered device that would otherwise not be available. For example, many automobile systems (e.g. navigation software, voice queries) rely on the presence of a smartphone for internet access. However, a smartphone in an automobile may suffer severe cellular signal loss due to movement of the automobile and/or weak cellular signal strength.

An alternative solution is to use a dedicated antenna on the automobile itself to make the long-range connection to the cellular network. Typically, the dedicated antenna has much better performance characteristics than those of the existing antennae used in consumer devices. The superior performance characteristics of the dedicated antenna can alleviate the efforts of cellular signal loss.

Clearly, the choice of the dedicated antenna to be used cannot be made independently of the environment in which it is employed. For example, a dedicated antenna with a large “footprint” cannot easily be integrated into an automobile. Conversely, reducing the footprint of the dedicated antenna to assist with integration could only serve to frustrate the superior performance characteristics for which the dedicated antenna exists.

Hence, there is a need for an antenna that has high gain, low directional preference, but is low profile so that it can be used in a variety of environments.

BRIEF SUMMARY OF THE INVENTION

According to the present invention there is provided an antenna comprising: a pair of electrically conducting first lands disposed in a first plane, the first lands being arranged to either side of, and spaced-apart from, an imaginary line on the first plane; antenna feed means for the pair of first electrically conducting lands; a pair of spaced-apart electrically conducting second lands, or a single second land, disposed in said first plane, said pair of second lands, or said single second land, being spaced-apart from the pair of first lands along said imaginary line, being electrically-insulated from the pair of first lands, and the pair of second lands being arranged to either side of, or the single second land extending across, said imaginary line; and a third conducting land oriented in a second plane substantially parallel to the first plane, the antenna further comprising a fourth conducting land in a third plane substantially parallel to both the first plane and the second plane, offset from both first plane and the second plane with the second plane located between the first and third planes.

The antenna in accordance with the invention offers two modes of operation in opposite boresight directions respectively. It can, dependent on the boresight direction, provide either lower gain over a wider bandwidth, or higher gain over a narrower bandwidth.

Preferably, the first plane is spaced apart from the second plane by a value in the range of between $9\lambda/100$ and $13\lambda/100$ for an antenna operating frequency of between 700 MHz to 1100 MHz, or in the range of $14\lambda/100$ to $18\lambda/100$ for an antenna operating frequency of between 470 MHz and 800 MHz, where λ is the wavelength of operation of the antenna or 8λ/100 and 12λ/100 for an antenna operating frequency between 200 MHz and 700 MHz.

Preferably, the pair of first lands are arranged symmetrically about the imaginary line and/or the pair of second lands are arranged symmetrically about said imaginary line, or said single second land is symmetrical about said imaginary line.

Where the antenna is intended to operate at frequencies between 700 MHz and 1.1 GHz, the first plane is preferably spaced from the second plane by between 3 cm and 4.3 cm and more preferably 4 cm.

For operation in the above frequency range, the first and second lands are preferably arranged in a substantially rectangular configuration in the first plane, with the imaginary line extending in a y-direction in the first plane, wherein the distance between the outer edges of the pair of first lands in an x-direction in the first plane, perpendicular to the y-direction, is between 8 cm and 9 cm and more preferably 8.5 cm, with a gap between the each of the first lands in the x-direction of between 0.5 cm and 1 cm and more preferably, 0.75 cm.

The overall distance between opposite outer edges of the pair of first lands and the pair of second lands, or between opposite outer edges the first lands and the single second land, is preferably between 8 cm and 10 cm in the y-direction and more preferably, 9 cm, with a gap between the first lands and the second lands, or the single second land, of between 1 cm and 3 cm in the y-direction and more preferably 2 cm.

Alternatively, where the antenna is intended to operate at frequencies between 470 MHz and 800 MHz, the first plane is preferably spaced from the second plane by between 6.9 cm and 8.8 cm and more preferably by 8 cm.

Here, the first and second lands are preferably arranged in a substantially rectangular configuration in the first plane, with the imaginary line extending in a y-direction in the first plane, wherein the overall distance between the outer edges of the pair of first lands in an x-direction in the first plane, perpendicular to the y-direction is between 16 cm and 19 cm and more preferably 17 cm.

Alternatively, where the antenna is intended to operate at frequencies between 200 MHz and 700 MHz the first plane is preferably spaced from the second ground plane by between 4.5 cm and 7.5 cm and the third plane by between 4.5 and 7.5 cm.

A gap between the first lands in the x-direction is preferably between 0.5 cm and 2 cm and more preferably 1 cm. The overall distance between opposite outer edges of the pair of first lands and the pair of second lands, or the single second land, is preferably between 16 cm and 18 cm in the y-direction and more preferably is 17 cm.

A gap between the first lands and the second lands, or between the first lands and the single second land, is preferably between 3 cm and 5 cm in the y-direction and more preferably is 4 cm.

Where the antenna comprises a pair of second lands, preferably all of the first and second lands are substantially the same size and shape or have shapes which are mirror images of one another.

Where the antenna comprises a pair of second lands, preferably each land of the first and second lands is of a size and shape and has a spacing with respect to the other lands so as to permit resonance at the operating frequency.

Each land is preferably generally rectangular or trapezoidal, which allows the antenna to be easily scaled to a frequency of operation.

The third and/or fourth conducting land may comprise an electrically conducting panel of a device or of an object in which the antenna is mounted.

The body part may comprise a panel of a metal door of an automobile or other object. Here the outer surface of the door may serve as the fourth land, with the first, second and third lands mounted within the door.

The third and/or fourth lands, and/or at least one of the first lands and/or the second land may be connected to an antenna ground and/or a system ground.

One or more of the second, third and/or fourth conducting lands, and/or one of the first lands may be connected to an antenna ground and/or a system ground. This can further improve the gain of the antenna.

BRIEF DESCRIPTION OF THE SEVERAL VIEWS OF THE DRAWINGS

One embodiment of the present invention will now be described, by way of example only, with reference to the accompanying figures.

DETAILED DESCRIPTION OF THE INVENTION

The antenna described with reference to the figures is intended to be used with GSM and/or Wi-Fi signals in the range of 700 MHz to 1.1 GHz and the antenna shown is optimized for signals of 900 MHz, towards the center of this range.

Figure 1:
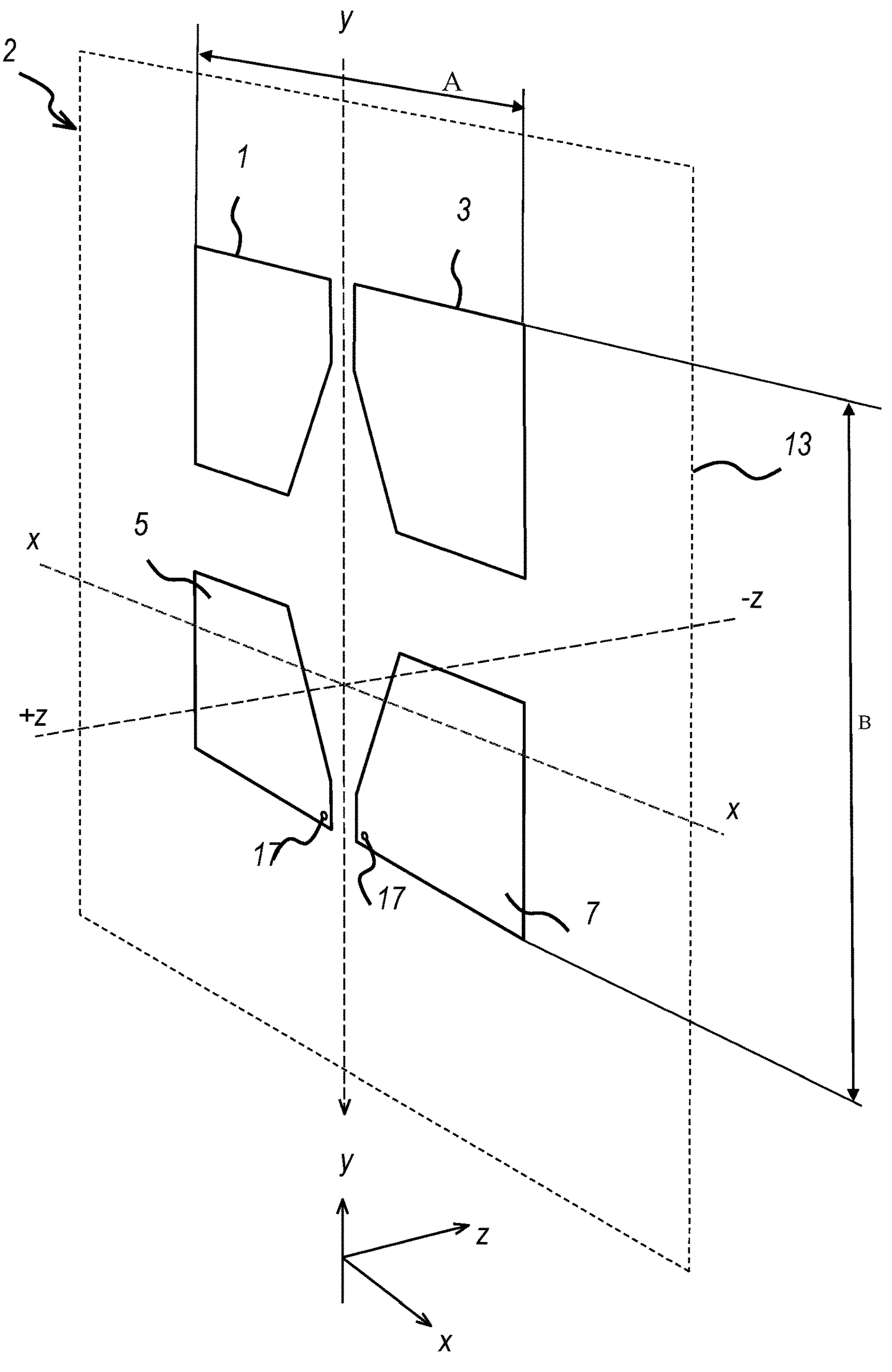
FIG. 1 is a schematic view showing an array of conductive elements which is used in conjunction with a first electrically conductive sheet of material to form a first portion of an antenna in accordance with the present invention.
Figure 2:
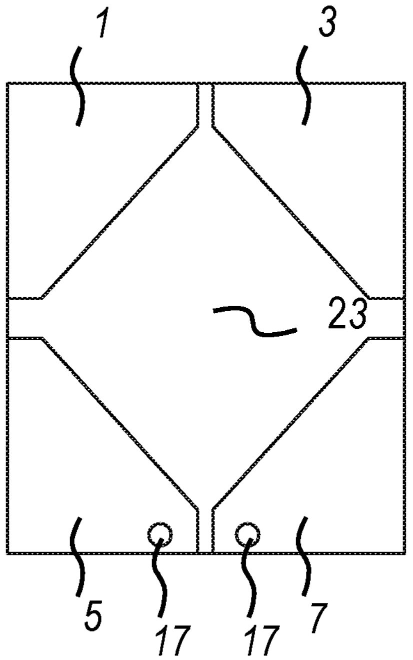
FIGS. 2(*a*), (*b*), (*c*) are schematic views showing XY elevations of the portion of antenna of FIG. 1, and FIG. 2(*d*) shows a YZ elevation of the portion of the antenna of FIG. 1.
Figure 2:
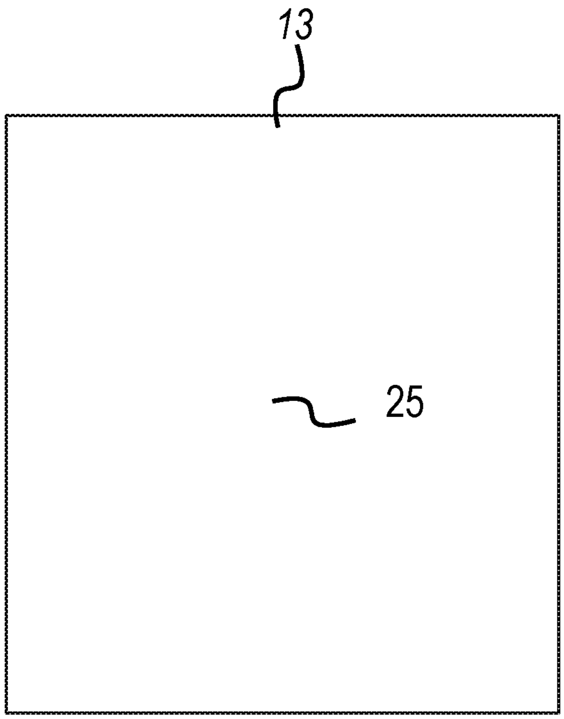
Figure 2:
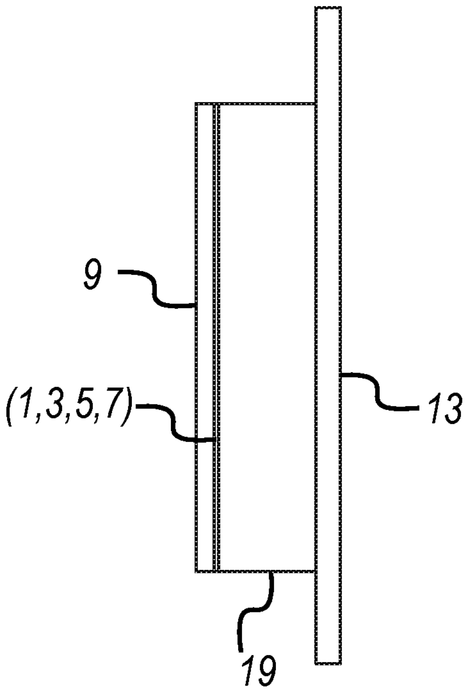
Figure 2:
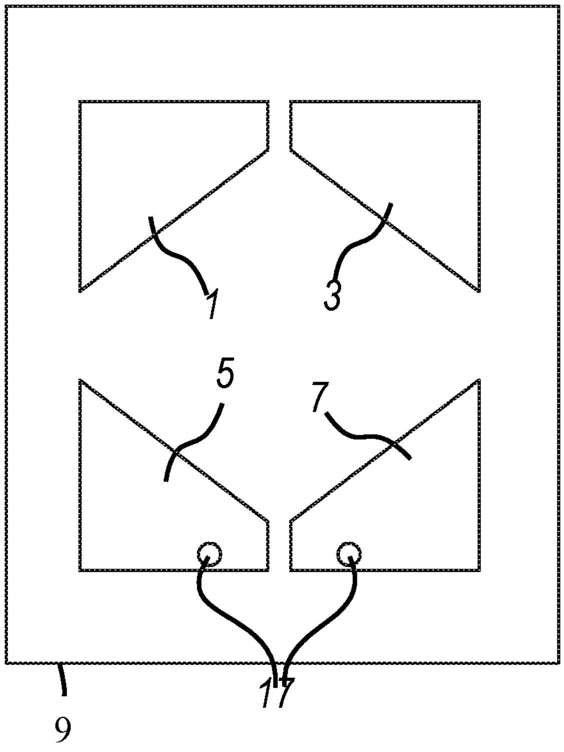

As shown in FIGS. 1, 2(*a*) and 2(*d*), a first portion of the antenna 2 comprises four spaced lands 1, 3, 5 and 7 in the XY plane (i.e. a first plane). Lands 5, 7 define a pair of first lands and the lands 1 and 3 define a pair of second lands. Lands 1, 3, 5 and 7, as shown, may have a fully or partially tapered edge from the y side to the x side (i.e. an edge which is at an angle in both the x and y directions). The lands 1, 3, 5 and 7 may be aluminium foil 1, 3, 5 and 7. The aluminium foil is approximately 200×10−10 meters in thickness, which gives an electrical resistance of about 1.5 ohms per square. The lands may be supported by a sheet 9 of stiff cardboard (to which the lands have been laminated by hot foil blocking). The foil may be overcoated with an electrically-insulating lacquer. The arrangement may be manufactured by sputtering aluminium to the desired thickness onto a lacquer-coated backing surface. The aluminium is then coated with adhesive and the combination hot foil blocked onto the sheet 9 (shown in FIG. 2(*c*)) with the adhesive adjacent the sheet. The backing surface is peeled away to leave the sheet 9, lands 1, 3, 5, and 7 and lacquer overcoating bonded together.

Alternatively, as opposed to using a sheet 9, the lands may be supported by a device in which the antenna 2 is used.

A feed 17 is taken from the pair of first lands 5 and 7 for obtaining a signal at a desired frequency.

Each of the pair of lands 1, 3 and 5, 7 respectively is spaced apart from and is symmetrical about an imaginary line y-y on the XY plane.

Where the antenna is to be used for frequencies in the range of 700 MHz to 1.1 GHz, the spacing between the lands 1 and 3 and the lands 5 and 7 respectively will typically be between 0.5 cm and 1 cm and more particularly 0.7 cm. Each of the lands 1, 3, 5 and 7 will typically have a maximum width in the x-direction of between 3.5 cm and 4.4 cm and, in the example shown, each has a maximum width in the x-direction of 3.9 cm.

The pairs of lands 1, 5 and 3, 7 respectively are separated by a gap in the y-direction of between 1.5 cm and 2.5 cm and, in the example shown, this gap is 2 cm. Each of the lands 1, 3, 5 and 7 has a height in the y-direction of between 3 cm and 4 cm and, in the example shown, the height in the y-direction of 3.5 cm. Thus, the overall width "A" of the rectangle defined by the four lands 1, 3, 5 and 7 is 8.5 cm and the height "B" is 9 cm, providing a very compact footprint.

Although expression such as "width" and "height" are used above, this is used for assistance only when referring to the antenna as shown in the drawings, for the antenna, in use, may have a different orientation to that shown.

With references to FIGS. 1, 2(*c*), and 2(*d*), the antenna also comprises a first electrically conductive sheet of material 13, i.e. a third land. As shown in FIG. 2(*c*), the first electrically conductive sheet of material 13 is in a second plane parallel to the first plane and the lands 1, 3, 5 and 7, but spaced apart from lands 1, 3, 5 and 7, in this example, by a none conducting spacing sheet 19. In this aspect, the spacing between the planes can be from about $9\lambda/100$ to $13\lambda/100$, where $\lambda$ is the wavelength of the frequency of operation of the antenna. For frequency bands centred on 900 MHz, A will be 33 cm and thus the gap may be in the range of 3 cm to 4.3 cm and, in the example shown, the gap is 4 cm. A centre 25 of the first electrically conductive sheet may align with a centre point 23 between the four lands 1, 3, 5, 7 on the first plane. The spacing between the third land 13 and the lands 1, 3, 5, 7 on the first plane, may comprise an insulator to tune the frequency of operation, or other antenna characteristics.

It will be appreciated that the size and/or shape of the lands can be varied according to the frequency of operation. For example, the configuration of the tapered edge can be varied to optimise performance. Other configurations include substantially square or trapezoidal.

The first sheet of electrically conducting material 13 (third land) has a maximum y-dimension of about 11 cm and maximum x-dimension of about 11 cm. With the above configuration, the antenna has good gain in both boresight directions and defined by the Z axis (as shown in FIG. 1) for frequencies in the range of 700 MHz to 1.1 GHz.

Figure 3:
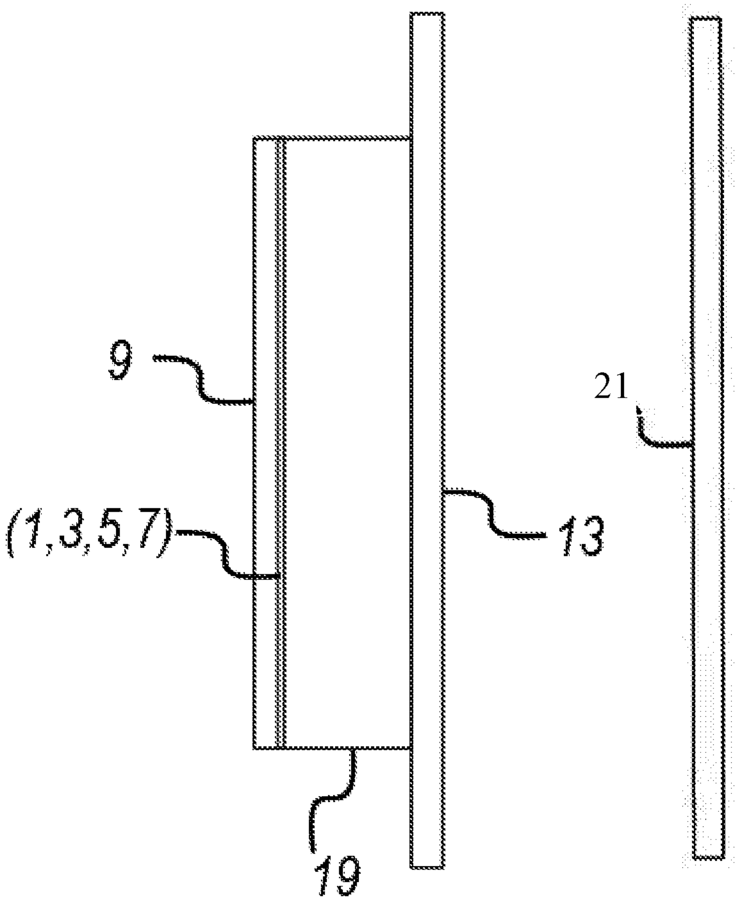
FIG. 3 shows a schematic view of an YZ elevation an antenna in accordance with the present invention, comprising that portion of the antenna seen if FIG. 2(*c*).

With reference to FIG. 3, the antenna is seen to comprise a second electrically conductive sheet of material 21, i.e. a fourth land, that is in a third plane parallel to the first and second planes, but spaced apart from the second plane by a distance approximately equal to that by which the first plane is spaced relative to the second plane. For operation in the range of 700 MHz to 1.1 GHz this separation may be between $9\lambda/100$ and $13\lambda/100$, and ideally about $3\lambda/25$, where A is the wavelength of operation of the antenna. Thus, for a range centred on 900 MHz, the third and first planes are separated by between 3 cm and 4.3 cm and ideally 4 cm.

Although, in FIG. 3, the fourth land 21 in the third plane parallel to the first and second planes is shown as a separate entity, it could be mounted relative to the first electrically conductive sheet of material 13, by a body of none conducting material similar to the material 19, separating the second electrically conductive sheet material 13 from the first and second lands 1, 3, 5, 7. However, as shown in FIG. 3, the third electrically conductive sheet 21 is supported separately and could, for example, be mounted around its edge to an outer none conductive housing, as could the first electrically conductive sheet of material 13. Alternatively, the second sheet of electrical conducting material 21 could be a conductive sheet of a larger device and could, for example, be a conductive panel of a motor car, television or other electrical device, including a panel of appropriate "white" goods, for example cookers, washing machines or fridge/freezers.

A centre 25 of the first electrically conductive sheet 13 may be in register with a centre point 23 between the lands 1, 3, 5 and 7 on the first plane. The spacing may comprise an insulator 19, as shown to tune the frequency of operation, or other antenna characteristics.

Where the second electrically conductive sheet of material 21 is not part of a larger sheet of a device, then the second electrically conductive sheet of material 21 may also be in register with a centre point 23, between the lands 1, 3, 5 and 7 on the first plane. Here the spacing between the first and second electrically conductive sheets of material 13, 21, may each comprise an insulator 19 to tune the frequency of operation, or other antenna characteristics.

The second sheet of electrical conducting material 21 can have a maximum y-dimension of about 12 cm and a maximum x-dimension of about 12 cm. It is found that this gives a further gain boost of about 2 dB to that outlined above in the 700 to 1100 MHz band at −Z boresight to give rise to a total relative gain boost of about 12 dB at −Z boresight with respect to +Z boresight.

Alternatively, the second sheet of electrical conducting material 21 may have a maximum y-dimension of about 30 cm and a maximum x-dimension of about 30 cm. It is found that this gives an even further gain boost of about 5 dB, i.e. larger than that for the first aspect of the first variation to that outlined above in the 700 to 1100 MHz band at −Z boresight to give rise to a total relative gain boost of about 15 dB at −Z boresight with respect to the +Z boresight.

It will be appreciated that the third and/or fourth conducting lands, and/or at least one of the first pair and second single or pair of conducting lands may be connected to an antenna ground and/or a system ground. This can be used to add further gain boosts.

It will also be appreciated that shorting non-fed pair(s) of lands can improve band selectively, and this can be achieved by shorting across a small area of exposed foil on each land.

The antenna has been described above with reference to operating with frequencies ranges in the range of 700 MHz to 1.1 GHz. However, by altering the dimensions of the components of the antenna, while retaining the same configuration of components, the same antenna configuration can be optimised for receiving signals in the range of 470 MHz to 800 MHz, as for example typically used for transmission of terrestrial television signals.

In order to optimise the antenna for receiving signals in the range of 470 MHz to 800 MHz, with reference to FIG.

1, the spacing between each of the pairs of lands 1, 3 and 5, 7 respectively would need to be in the range of between 0.5 cm and 1.5 cm and ideally would be 1 cm, where the antenna is optimised for receiving signals centred on 600 MHz. The width of each of the lands 1, 3, 5 and 7 in the x-direction, as shown in FIG. 1, would then be between 7 cm and 9 cm and ideally would be 8 cm, making the overall width "A" of the antenna 17 cm, (between the opposed outer edges of the lands 1, 3 and 5, 7 respectively). Each of the lands 1, 3, 5 and 7 would then preferably have a maximum dimension in the y-direction of between 5.5 cm and 7.5 cm and ideally would have a height of 6.5 cm in the y-direction. The gap between pairs of lands 1, 5 and 3, 7 respectively would then be in the range of between 3 cm and 5 cm and ideally 4 cm giving an overall maximum dimension in the y-direction for the lands 1, 3, 5 and 7 in the plane 2 of 17 cm. The third and fourth lands would similarly be scaled up in size and the optimal dimension of the third land would be 18 cm by 18 cm and 15 cm by 15 cm respectively.

Figure 4A:
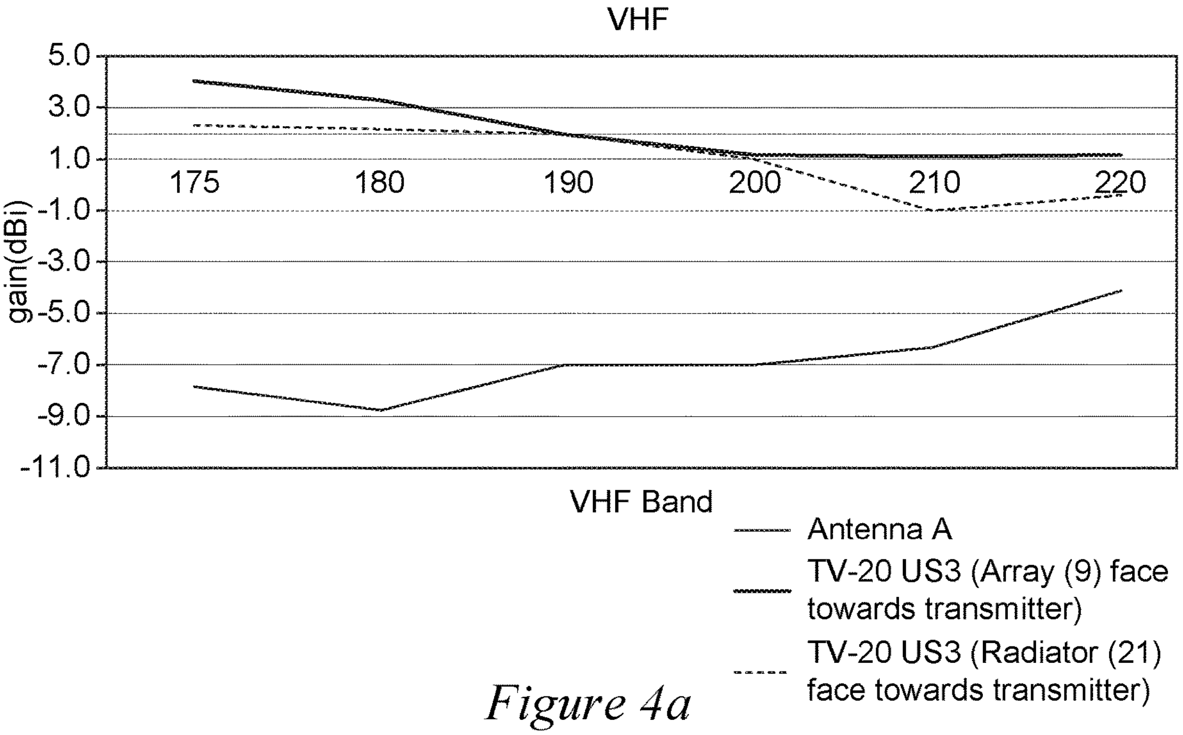
FIGS. 4(*a*) & (*b*) show graph illustrations of the gain of the antenna of FIG. 3 at VHF and UHF frequencies respectively, versus a market leading antenna of 2020.
Figure 4B:
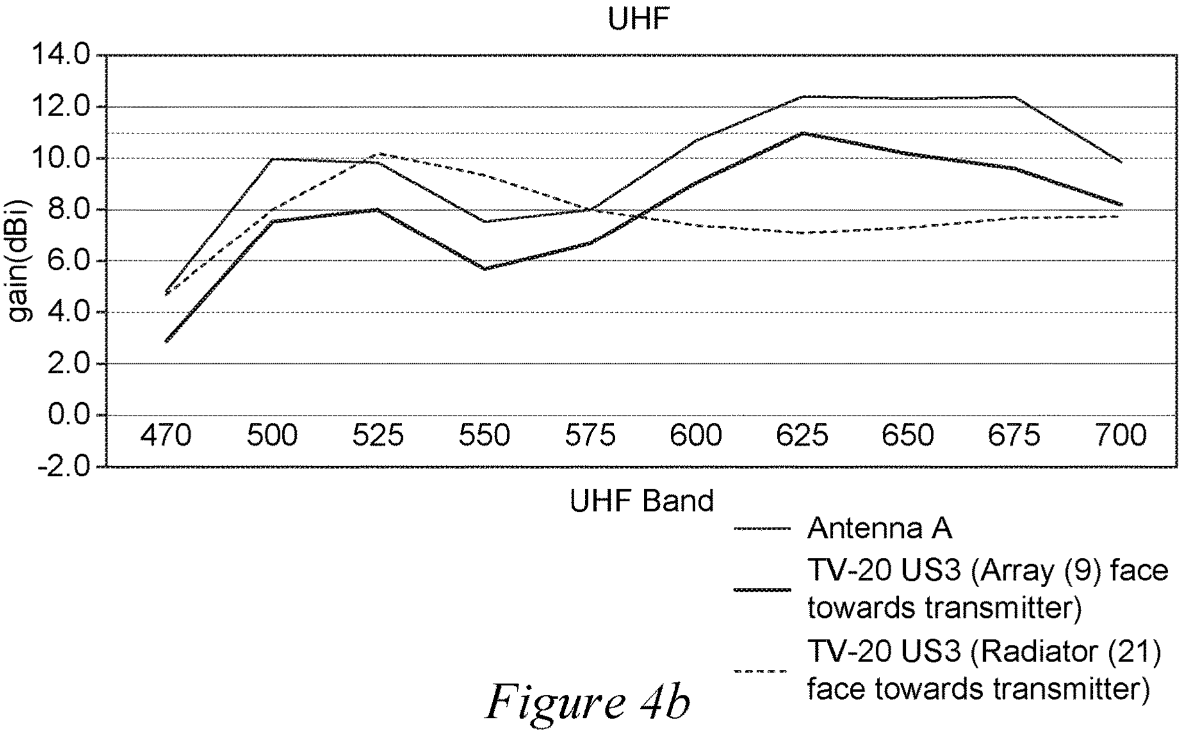

FIGS. 4*a* and 4*b* depict VHF and UHF frequency sweeps for gain for both boresight directions, of an antenna in accordance with the present invention, in comparison with a market leading antenna. Of particular note is that the overall dimensions of the housing of the antenna in accordance with the present invention, in this test, were just over 18 cm×18 cm×12 cm, with the first and second electrically conductive sheets of material measuring 18 cm by 18 cm and 15 cm by 15 cm with the first, second and third planes spaced, in this test, between 7 and 8 cms apart, as compared with the significantly larger dimensions of the comparison product.

In a first environment, antenna 2 may be integrated in a consumer electronic device. Such a device with which the antenna can be integrated typically has a display panel, such as an LCD, LED, OLED, AMOLED, plasma, or the like, display panel. The panel of the display is typically electrically conductive and can thus serve as the second electrically conductive sheet 21 of the antenna 2. To further increase the effectiveness of the antenna 2, one of the feeds 17 can be electrically coupled to a ground connection of an electronic system of the consumer electronic device.

Typically, the display panel is connected to this same ground connection of the electronic system of the consumer electronic device. Similarly, the skilled person would appreciate that the ground connection of the electronic system can be system ground, signal ground, circuit ground, chassis ground, or equivalent.

A housing of the consumer electronic device can also support the lands 1, 3, 5 and 7, which can be mounted inside or outside the housing, or be embedded therein to achieve any of the desired spacings of the lands 1, 3, 5 and 7 from the display panel (second electrically conductive surface 13).

In principle, antenna 2 can be integrated into any consumer electronics device in accordance with the principles disclosed herein.

In a second environment, antenna 2 can be integrated in an automobile component. The body (where metallic) of the automobile can serve as the second electrically conductive sheet 21 of the antenna. The first electrical sheet and lands 1, 3, 5 and 7 can then be mounted within the body. To further increase the effectiveness of the antenna 2, one of the feeds 17 can be electrically coupled to a ground connection of an electronic system of the automobile.

Any of the above arrangements could be used to provide cellular-based WAN access, and in particular the current 3G/4G MHz bands. Such 3G/4G MHz bands could be well served by the gain boost provided by the antenna 2 when in the presence of a weak cellular signal.

Further, an antenna system may be formed using two antennas 2 (i.e. any of the variants disclosed above). This allows multiple-input and multiple-output, MIMO, implementations to be used.

Although the lands are described as being formed by laminating aluminium foil lands by hot foil blocking onto stiff cardboard, it is possible to use lands in the form of thin electrically conductive materials such as aluminium manufactured to present as foil type lands. In addition the foil type lands can be manufactured from microwave materials by selecting a material with the appropriate properties such as dielectric constant, thickness and conductor type. Hence, use of the word foil is used to mean both lands formed from a foil and lands formed in other ways which present similarly in the form of foil type elements.

It will be appreciated that this description is by way of example only; alternations and modifications may be made to the described embodiment without departing from the scope of the invention as defined in the claims.

I claim:

1. An antenna, comprising:

a pair of electrically conducting first lands disposed in a first plane, the pair of first lands being arranged to either side of, and spaced-apart from, an imaginary line on the first plane;

antenna feed means for the pair of electrically conducting first lands;

a pair of spaced-apart electrically conducting non-fed second lands, disposed in said first plane, the pair of second lands being spaced-apart from the pair of first lands along said imaginary line, being electrically-insulated from the pair of first lands, and the pair of second lands being arranged to either side of said imaginary line;

a non-fed third conducting land oriented in a second plane substantially parallel to the first plane; and a non-fed fourth conducting land in a third plane substantially parallel to both the first plane and the second plane, offset from both first plane and the second plane with the second plane located between the first and third planes.

2. The antenna of claim 1, wherein the first plane is spaced apart from the second plane by a value in the range of between $9\lambda/100$ and $13\lambda/100$ for an antenna operating frequency of between 700 MHz to 1100 MHz or in the range of $14\lambda/100$ to $18\lambda/100$ for an antenna operating frequency of between 470 MHz and 800 MHZ, and wherein $\lambda$ is the wavelength of operation of the antenna, or $8\lambda/100$ and $12\lambda/100$ for an antenna operating frequency between 200 MHz and 700 MHz.

3. The antenna of claim 1, wherein the pair of first lands are arranged symmetrically about the imaginary line.

4. The antenna of claim 1, wherein the pair of second lands are arranged symmetrically about said imaginary line.

5. The antenna of claim 1, wherein the antenna is intended to operate at frequencies between 700 MHz and 1.1 GHz and the first plane is spaced from the second plane by between 3 cm and 4.3 cm.

6. The antenna of claim 5, wherein the pair of first lands and the pair of second lands are arranged in a rectangular configuration in the first plane with the imaginary line extending in a y-direction in the first plane, and wherein the distance between outer edges of the pair of first lands in an x-direction in the first plane, perpendicular to the y-direction, is between 8 cm and 9 cm.

7. The antenna of claim 6, wherein a gap between each of the pair of first lands in the x-direction is between 0.5 cm and 1.2 cm.

8. The antenna of claim 6, wherein overall distance between opposite outer edges of the pair of first lands and the pair of second lands is between 8 cm and 10 cm in the y-direction.

9. The antenna of claim 8, wherein a gap between the pair of first lands and the pair of second lands is between 1 cm and 3 cm in the y-direction.

10. The antenna of claim 1, wherein the antenna is intended to operate at frequencies between 470 MHz and 800 MHz and the first plane is spaced from the second plane by between 4.9 cm and 8.9 cm.

11. The antenna of claim 10, wherein the first and second lands are arranged in a rectangular configuration in the first plane with the imaginary line extending in a y-direction in the first plane, and wherein the overall distance between the outer edges of the pair of first lands in an x-direction in the first plane, perpendicular to the y-direction is between 16 cm and 19 cm.

12. The antenna of claim 11, wherein a gap between the first lands in the x-direction is between 0.5 cm and 2 cm.

13. The antenna of claim 11, wherein the overall distance between opposite outer edges of the pair of first lands and the pair of second lands is between 16 cm and 18 cm in the y-direction.

14. The antenna of claim 13, wherein a gap between the first lands and the second lands is between 3 cm and 5 cm in the y-direction.

15. The antenna of claim 1, wherein the third plane is spaced apart from the second plane by a distance equal to that by which the second plane is spaced from the first plane.

16. The antenna of claim 1, wherein each land of the pair of first lands and the pair of second lands is the same size and shape or have shapes which are mirror images of one another.

17. The antenna of claim 1, wherein each land of the pair of first lands and the pair of second lands is of a size and shape and has a spacing with respect to the other lands so as to permit resonance at the operating frequency.

18. The antenna of claim 1, wherein each land of the pair of first lands and the pair of second lands is rectangular or trapezoidal.

19. The antenna of claim 1, wherein the third and/or fourth conducting land comprise an electrically conducting panel of a device or of an object in which the antenna is mounted.

20. The antenna of claim 19, wherein the panel is comprised of a body part or a panel of an automobile.

* * * * *